US010667297B2

(12) United States Patent
Singh et al.

(10) Patent No.: US 10,667,297 B2
(45) Date of Patent: May 26, 2020

(54) MOBILITY-AWARE CONTENTION PROCEDURES ON A SHARED COMMUNICATION MEDIUM

(71) Applicant: QUALCOMM Incorporated, San Diego, CA (US)

(72) Inventors: Damanjit Singh, San Diego, CA (US); Chirag Sureshbhai Patel, San Diego, CA (US); Rajat Prakash, San Diego, CA (US); Farhad Meshkati, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 35 days.

(21) Appl. No.: 15/424,569

(22) Filed: Feb. 3, 2017

(65) Prior Publication Data
US 2018/0227954 A1     Aug. 9, 2018

(51) Int. Cl.
*H04W 74/08*     (2009.01)
*H04W 76/18*     (2018.01)
*H04W 36/08*     (2009.01)
*H04W 16/16*     (2009.01)

(52) U.S. Cl.
CPC ....... *H04W 74/0816* (2013.01); *H04W 36/08* (2013.01); *H04W 76/18* (2018.02); *H04W 16/16* (2013.01)

(58) Field of Classification Search
CPC . H04W 16/14; H04W 16/16; H04W 74/0816; H04W 74/0825; H04W 36/0055; H04W 36/0079; H04W 36/30; H04W 74/085; H04W 74/0858
See application file for complete search history.

(56) References Cited

U.S. PATENT DOCUMENTS

| 2007/0263654 | A1 | 11/2007 | Salokannel et al. |
| 2011/0105121 | A1* | 5/2011 | Kazmi ................. H04W 36/30 455/436 |
| 2014/0016617 | A1* | 1/2014 | Froberg Olsson .... H04W 36/00 370/331 |

(Continued)

FOREIGN PATENT DOCUMENTS

| EP | 2086263 A1 | 8/2009 |
| EP | 3171638 A1 | 5/2017 |
| WO | 2016010394 A1 | 1/2016 |

OTHER PUBLICATIONS

International Search Report and Written Opinion—PCT/US2017/065299—ISA/EPO—dated Mar. 8, 2018.

(Continued)

*Primary Examiner* — Pao Sinkantarakorn
(74) *Attorney, Agent, or Firm* — Muncy, Geissler, Olds & Lowe, P.C.

(57) ABSTRACT

Techniques for mobility-aware contention procedures on a shared communication medium are disclosed. A connection failure associated with mobility between a source access point and a target access point sharing a communication medium may be detected. Based on the detected connection failure, a backoff threshold associated with contention-based access to the communication medium may be adapted. Contention for access to the communication medium may then proceed in accordance with the adapted backoff threshold.

26 Claims, 11 Drawing Sheets

(56) References Cited

U.S. PATENT DOCUMENTS

2016/0285679 A1  9/2016  Dudda et al.
2017/0079013 A1* 3/2017  Noh .................... H04W 72/042

OTHER PUBLICATIONS

Samsung: "Reducing RACH Congestion Probability for MBMS", 3GPP Draft; R2-030729, 3rd Generation Partnership Project (3GPP), Mobile Competence Centre; 650, Route Des Lucioles; F-06921 Sophia-Antipolis Cedex; France, vol. RAN WG2, No. Seoul, Korea; Apr. 8, 2003, Apr. 8, 2003 (Apr. 8, 2003), pp. 1-2, XP050123330, [retrieved on Apr. 8, 2003].

* cited by examiner

MOBILITY-AWARE CONTENTION PROCEDURES ON A SHARED COMMUNICATION MEDIUM

BACKGROUND

Aspects of this disclosure relate generally to telecommunications, and more particularly to operations on a shared communication medium and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as $5^{th}$ Generation (5G)/New Radio (NR), Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" access points provide connectivity and coverage to a large number of users over a certain geographical area. A macro network deployment is carefully planned, designed, and implemented to offer good coverage over the geographical region. To improve indoor or other specific geographic coverage, such as for residential homes and office buildings, additional "small cell," typically low-power access points have recently begun to be deployed to supplement conventional macro networks. Small cell access points may also provide incremental capacity growth, richer user experience, and so on.

Small cell operations have been extended into so-called "unlicensed" and "lightly licensed" frequency spectra, for example, such as the Unlicensed National Information Infrastructure (U-NII) band and the Citizens Broadband (CB) Radio Service band. This extension of small cell operation is designed to increase spectral efficiency and hence overall system capacity. However, it may also lead to varying degrees of interference between small cell access points and operators as their devices compete for access to shared resources.

SUMMARY

The following summary is an overview provided solely to aid in the description of various aspects of the disclosure and is provided solely for illustration of the aspects and not limitation thereof.

In one example, a communication method is disclosed. The method may include, for example, detecting a connection failure associated with mobility between a source access point and a target access point sharing a communication medium; adapting, based on the detected connection failure, a backoff threshold associated with contention-based access to the communication medium; and contending for access to the communication medium in accordance with the adapted backoff threshold.

In another example, a communication apparatus is disclosed. The apparatus may include, for example, at least one processor, at least one memory coupled to the at least one processor, and at least one transceiver. The at least one processor and the at least one memory may be configured to detect a connection failure associated with mobility between a source access point and a target access point sharing a communication medium and to adapt, based on the detected connection failure, a backoff threshold associated with contention-based access to the communication medium. The at least one transceiver may be configured to contend for access to the communication medium in accordance with the adapted backoff threshold.

In another example, another communication apparatus is disclosed. The apparatus may include, for example, means for detecting a connection failure associated with mobility between a source access point and a target access point sharing a communication medium; means for adapting, based on the detected connection failure, a backoff threshold associated with contention-based access to the communication medium; and means for contending for access to the communication medium in accordance with the adapted backoff threshold.

In another example, a transitory or non-transitory computer-readable medium is disclosed, which, when executed by at least one processor, causes the at least one processor to perform operations for communication. The computer-readable medium may include, for example, code for detecting a connection failure associated with mobility between a source access point and a target access point sharing a communication medium; code for adapting, based on the detected connection failure, a backoff threshold associated with contention-based access to the communication medium; and code for contending for access to the communication medium in accordance with the adapted backoff threshold.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
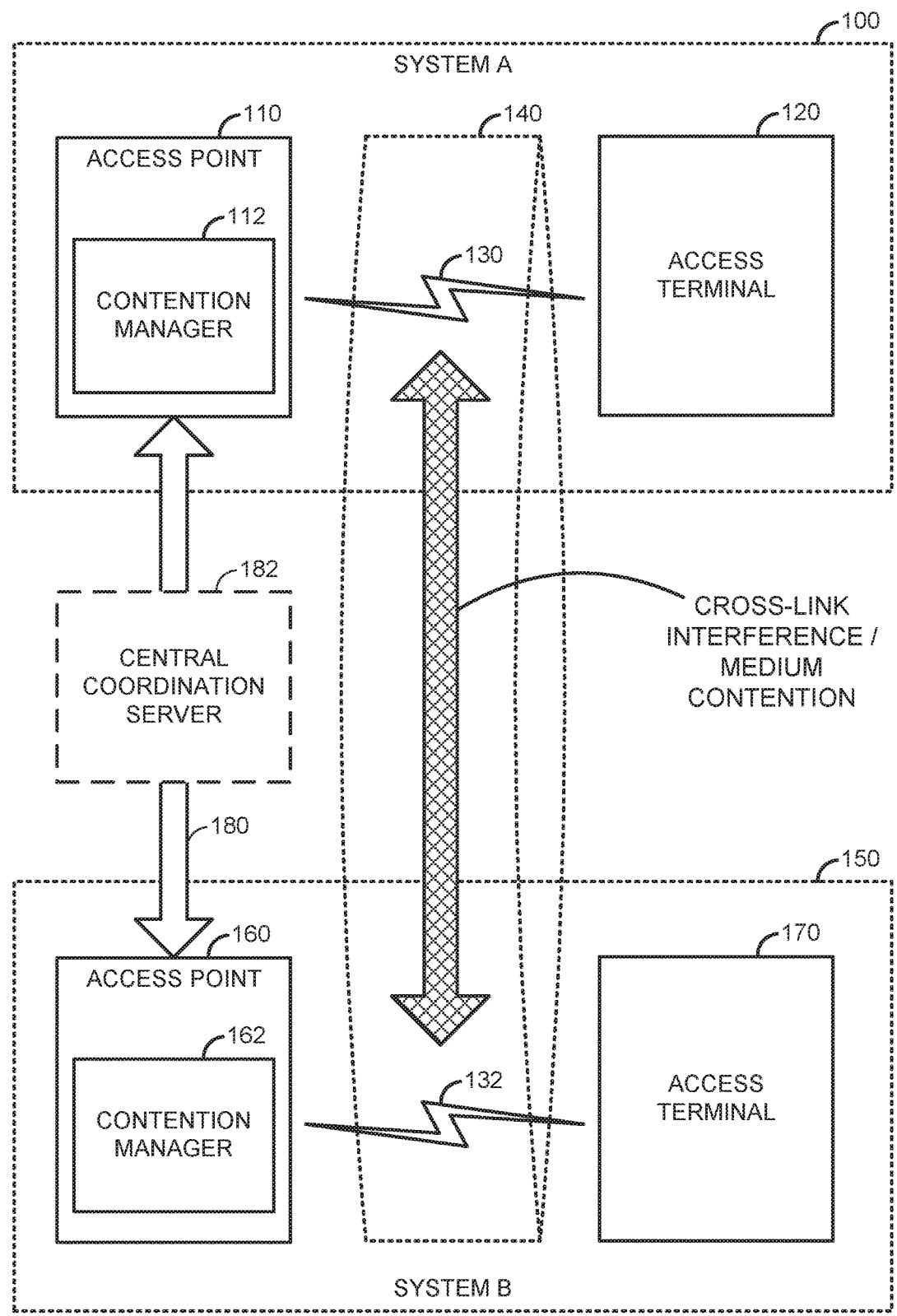
FIG. 1 is a system-level diagram illustrating an example wireless network environment.

The present disclosure relates generally to mobility-aware contention procedures on a shared communication medium. To improve mobility performance when contention-based access is employed on the communication medium (including both connected-mode mobility, which may be referred to as handover, and idle-mode mobility), one or more backoff thresholds that determine how deferential systems are to one another in contending for access to the communication medium can be adapted based on the detection of a connection failure. For example, a serving access point and a target access point may agree to lower the backoff threshold they use with respect to each other in response to detecting that a connection failure has occurred between them. A more deferential backoff threshold may help to prevent or reduce simultaneous transmission, thus effectively increasing the transition region and associated time for completing transition from one access point to the other. This approach may be used in addition or as an alternative to adapting other, mobility-related parameters, as well as selectively for different types of connection failures (e.g., those based on interference-related failures rather than coverage holes). The access points involved may coordinate their backoff thresholds to maintain fairness, and implement different thresholds in different ways (e.g., using preamble detection as opposed to energy detection mechanisms). Different thresholds may also be used for different groups of entities (e.g., those associated with a particular Radio Access Technology (RAT)) or different specific entities (e.g., those associated with a particular Cell Identifier (Cell ID)).

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

FIG. 1 is a system-level diagram illustrating an example wireless network environment, shown by way of example as including two systems, a first system A 100 and a second system B 150. Each system may be composed of different wireless nodes generally capable of receiving and/or transmitting over a wireless link, including information related to various types of communication (e.g., voice, data, multimedia services, associated control signaling, etc.). The first system A 100 is shown as including an access point 110 and an access terminal 120 in communication with each other over a wireless link 130. The second system B 150 is shown as including its own access point 160 and access terminal 170 in communication with each other over a separate wireless link 132. In some deployments, the two systems may communicate with other via a backhaul connection 180 (e.g., a so-called "X2" interface), either with or without an intermediary such as an (optional) central coordination server 182 or the like.

In general, the two systems may be deployed by the same or by different operators (e.g., a common or distinct company or other entity controlling authorization, system timing, etc.) and utilize the same or different access technologies. As an example, the access point 110 and the access terminal 120 of the first system A 100 may communicate via the wireless link 130 in accordance with a Long Term Evolution (LTE) technology or a variant thereof (e.g., MuLTEfire, Licensed Assisted Access (LAA), etc.), while the access point 160 and the access terminal 170 of the second system B 150 may communicate via the wireless link 132 in accordance with the same LTE technology or a different technology (e.g., Wi-Fi technology). It will be appreciated that each system may support any number of wireless nodes (access points, access terminals, etc.) distributed throughout a geographic region, with the illustrated entities being shown for illustration purposes only. Instead of LTE technology, persons skilled in the art will appreciate that communications via wireless links 130 and 132 may be configured in accordance with a fifth generation (5G)/new radio (NR) technology or a variant thereof, among others.

Unless otherwise noted, the terms "access terminal" and "access point" are not intended to be specific or limited to any particular Radio Access Technology (RAT). In general, access terminals may be any wireless communication device allowing a user to communicate over a communications network (e.g., a mobile phone, router, personal computer, server, entertainment device, Internet of Things (IOT)/Internet of Everything (IOE) capable device, in-vehicle communication device, etc.), and may be alternatively referred to in different RAT environments as a User Device (UD), a Mobile Station (MS), a Subscriber Station (STA), a User Equipment (UE), etc. Similarly, an access point may operate according to one or several RATs in communicating with access terminals depending on the network in which the access point is deployed, and may be alternatively referred to as a Base Station (BS), a Network Node, a NodeB, an evolved NodeB (eNB), etc. Such an access point may correspond to a small cell access point, for example. "Small cells" generally refer to a class of low-powered access points that may include or be otherwise referred to as femto cells, pico cells, micro cells, Wireless Local Area Network (WLAN) access points, other small coverage area access points, etc. Small cells may be deployed to supplement macro cell coverage, which may cover a few blocks within a neighborhood or several square miles in a rural environment, thereby leading to improved signaling, incremental capacity growth, richer user experience, and so on.

Returning to FIG. 1, the wireless link 130 used by the first system A 100 and the wireless link 132 used by the second system B 150 may operate over a shared communication medium 140. A communication medium of this type may be composed of one or more frequency, time, and/or space communication resources (e.g., encompassing one or more channels across one or more carriers). As an example, the communication medium 140 may correspond to at least a portion of an unlicensed or lightly licensed frequency band. Although different licensed frequency bands have been reserved for certain communications (e.g., by a government entity such as the Federal Communications Commission (FCC) in the United States), some systems, in particular those employing small cell access points, have extended operation into unlicensed and lightly licensed frequency bands such as the Unlicensed National Information Infrastructure (U-NII) band and the Citizens Broadband (CB) Radio Service band.

Due to the shared use of the communication medium 140, there is the potential for cross-link interference between the wireless link 130 and the wireless link 132. Further, some RATs and some jurisdictions may require contention or "Listen Before Talk (LBT)" for arbitrating access to the communication medium 140. As an example, a Clear Channel Assessment (CCA) protocol may be used in which each device verifies via medium sensing the absence of other traffic on a shared communication medium before seizing (and in some cases reserving) the communication medium for its own transmissions. In some designs, the CCA protocol may include distinct CCA Preamble Detection (CCA-PD) and CCA Energy Detection (CCA-ED) mechanisms utilizing different backoff thresholds for yielding the communication medium to intra-RAT and inter-RAT traffic, respectively. The European Telecommunications Standards Institute (ETSI), for example, mandates contention for all devices regardless of their RAT on certain communication media such as unlicensed frequency bands.

Figure 2:
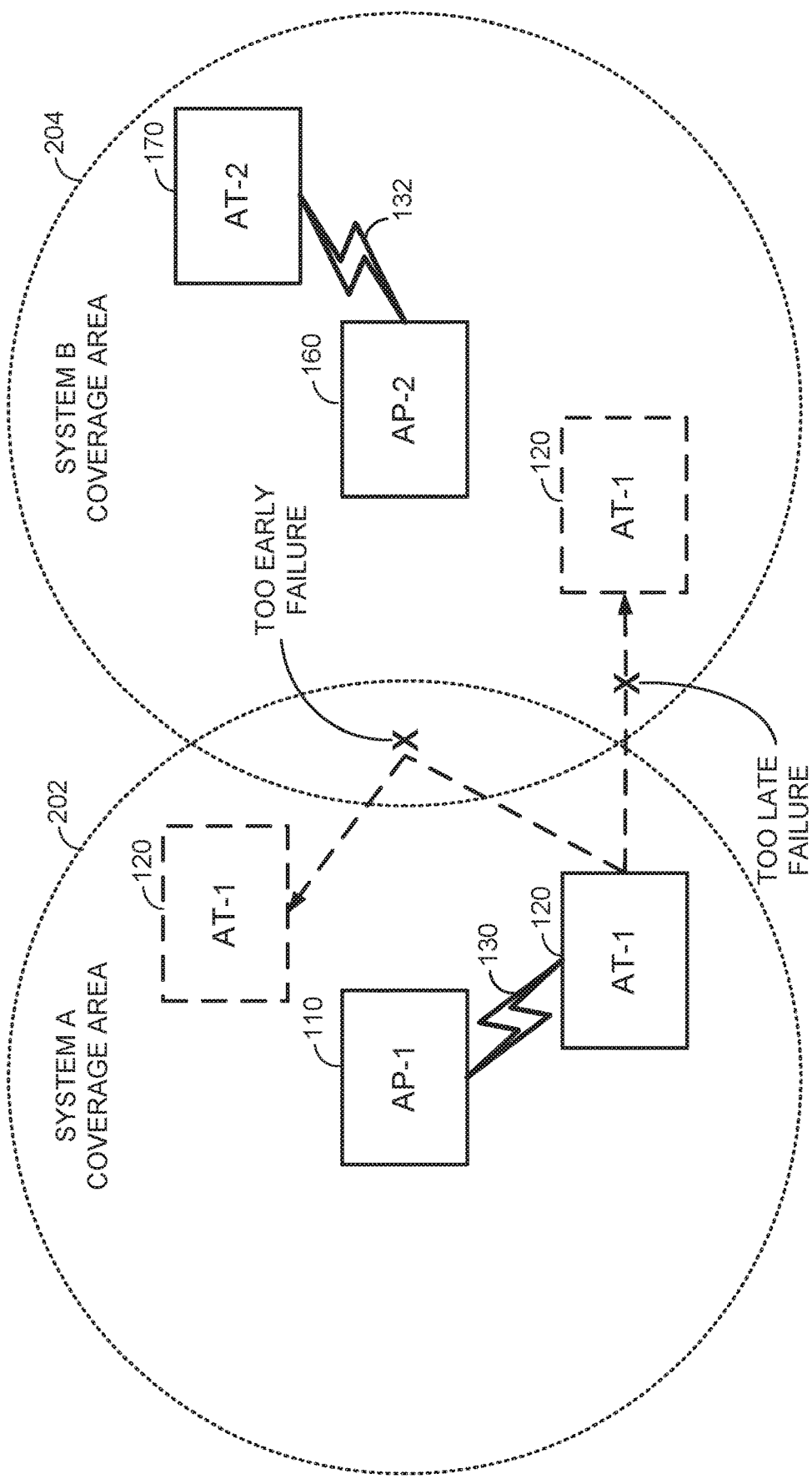
FIG. 2 illustrates an example of inter-access point mobility and connection failure scenarios.

FIG. 2 illustrates an example of inter-access point mobility and connection failure scenarios. In this example, the access point 110 (AP-1) of the first system A 100 is shown as being deployed in the vicinity of the access point 160 (AP-2) of the second system B 150. Each of the access points 110 and 160 provides communication services over respective coverage areas 202 and 204 to their respective access terminals, shown by way of example as the access terminal 120 (AT-1) and the access terminal 170 (AT-2). Because of the overlap between the two coverage areas 202 and 204, the access terminal 120, for example, may, under certain conditions or scenarios, attempt a transition from the access point 110 to the access point 160, with the access point 110 acting as the "source" access point for the transition procedure and the access point 160 acting as the "target" access point for the transition procedure (including both connected-mode mobility procedures, which may be referred to as handover, and idle-mode mobility procedures).

Connection failures such as Radio Link Failure (RLF) and handover failure may occur for various reasons and be detected in different ways, including using communication between the serving access point 110 and the target access point 160 or between the access terminal 120 and the serving access point 110 and/or the target access point 160. For example, the serving access point 110 and/or the target access point 160 may detect connection failures using Mobility Robustness Optimization (MRO) procedures or the like. MRO is defined in 3GPP TS 36.300 Release 9 and onward, and includes procedures for detecting and classifying connection failures as "too late handover," "too early handover," and "handover to wrong cell."

Two example connection failures are illustrated in FIG. 2, including a so-called "too late" handover failure and a "too early" handover failure. Handovers, for example, that are "too late" are connection failures that may occur at the serving access point 110 before a handover is initiated or during the handover, prompting the access terminal 120 to initiate a re-establishment procedure to re-establish a radio link connection at the target access point 160. This may occur, for example, if the access terminal 120 is moving more quickly than a corresponding handover policy can accommodate. Handovers that are "too early" are connection failures that may occur shortly after a successful handover or during a handover of the access terminal 120 to the target access point 160, prompting the access terminal 120 to initiate a re-establishment procedure to re-establish a radio link connection with the serving access point 110. This may occur, for example, when the access terminal 120 enters and quickly exits a small, island coverage region of the target access point 160. Other example connection failures include "wrong cell" handover where the access terminal 120 attempts to transition to a different access point.

Connection failure can be conventionally addressed to some degree by changing different mobility-specific parameters for the serving access point 110 and/or the target access point 160 (e.g., a signal quality offset parameter, a hysteresis parameter, an event offset parameter such as a3-offset, a cell individual offset parameter, a reporting range parameter, a frequency offset parameter, a time-to-trigger parameter, etc.). For example, if a delay in transitioning to the target access point 160 causes a connection failure, a corresponding parameter can be changed to allow earlier mobility. However, this approach may be insufficient or at least sub-optimal when contention-based access is employed on the communication medium 140.

To improve mobility performance, the access point 110 and/or the access point 160 may be configured for mobility-aware contention procedures for accessing the communication medium 140. For example, the access point 110 may include a contention manager 112 and the access point 160 may include a contention manager 162, as shown in FIG. 1. The contention manager 112 and/or the contention manager 162 may be configured in different ways to manage contention-based access to the communication medium 140 based on any detected connection failures.

Figure 3:
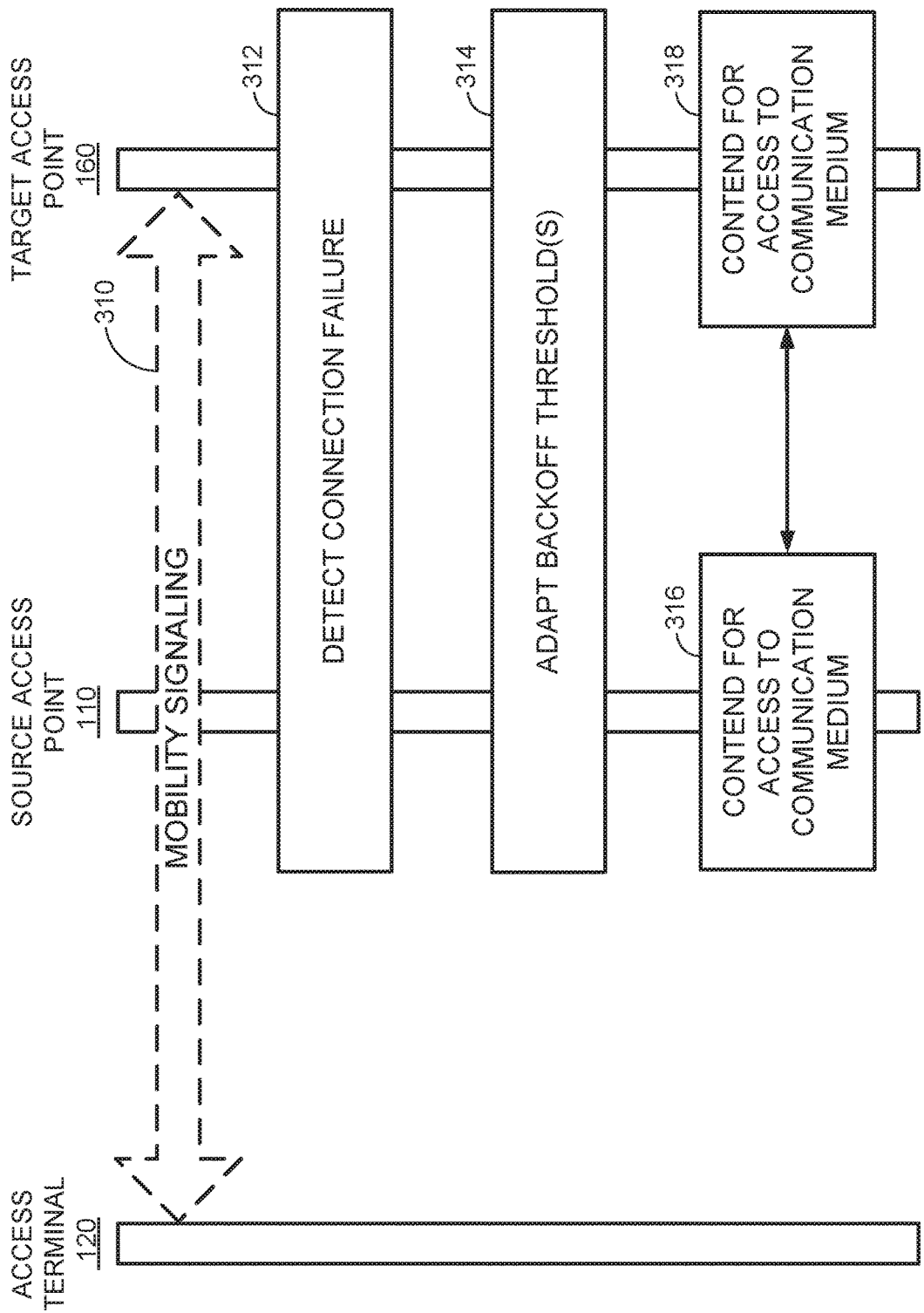
FIG. 3 is a signaling flow diagram illustrating example aspects of mobility-aware contention.

FIG. 3 is a signaling flow diagram illustrating example aspects of mobility-aware contention. It will be appreciated that the illustrated signaling is a generalization shown only in relevant part, and that certain illustrated signaling may be omitted while other signaling may be added for a given mobility or contention procedure implementation.

Continuing with the example deployment scenario of FIG. 2, the access terminal 120 in FIG. 3 initially operates in an idle or connected state with the serving access point 110 (e.g., a Radio Resource Control (RRC) connection or the like) in the vicinity of the target access point 160. At some point, a transition is initiated for the access terminal 120 and corresponding mobility signaling 310 is exchanged. The serving access point 110 and/or the target access point 160 may monitor the mobility signaling 310 as well as any other relevant information to detect whether a connection failure has occurred (block 312). As discussed above, connection failures such as handover failure and RLF may occur for various reasons and be detected in different ways, including via MRO procedures and the like, or other connection failure detection and classification techniques as may be available or appropriate for different applications and different RATs.

Based on the detected connection failure, the serving access point 110 and/or the target access point 160 may adapt one or more backoff thresholds associated with contention-based access to the communication medium 140 (block 314) and contend for access to the communication medium 140 in accordance with the adapted backoff threshold (respective blocks 316 and 318). By adapting a backoff threshold in addition or as an alternative to any distinct mobility parameter adaptation, the interference between the serving access point 110 and the target access point 160 at any given time can be minimized or at least reduced. For example, the serving access point 110 may lower the backoff threshold it uses with respect to the target access point 160 from a first value to a second value in response to detecting the connection failure in order to increase the likelihood that the serving access point 110 will yield the communication medium 140 to the target access point 160. Yielding the communication medium 140, in turn, reduces the interference perceived by the access terminal 120 at the boundary between the coverage areas 202 and 204, thereby reducing the interference portion of the perceived Signal-to-Interference-plus-Noise (SINR) ratio that is used to determine various aspects related to mobility (e.g., when and how soon a transition is desirable, etc.). Put another way, a more deferential backoff threshold may help to prevent or reduce simultaneous transmission by the serving access point 110 and the target access point 160, thus effectively increasing the transition region and associated time.

Figure 4:
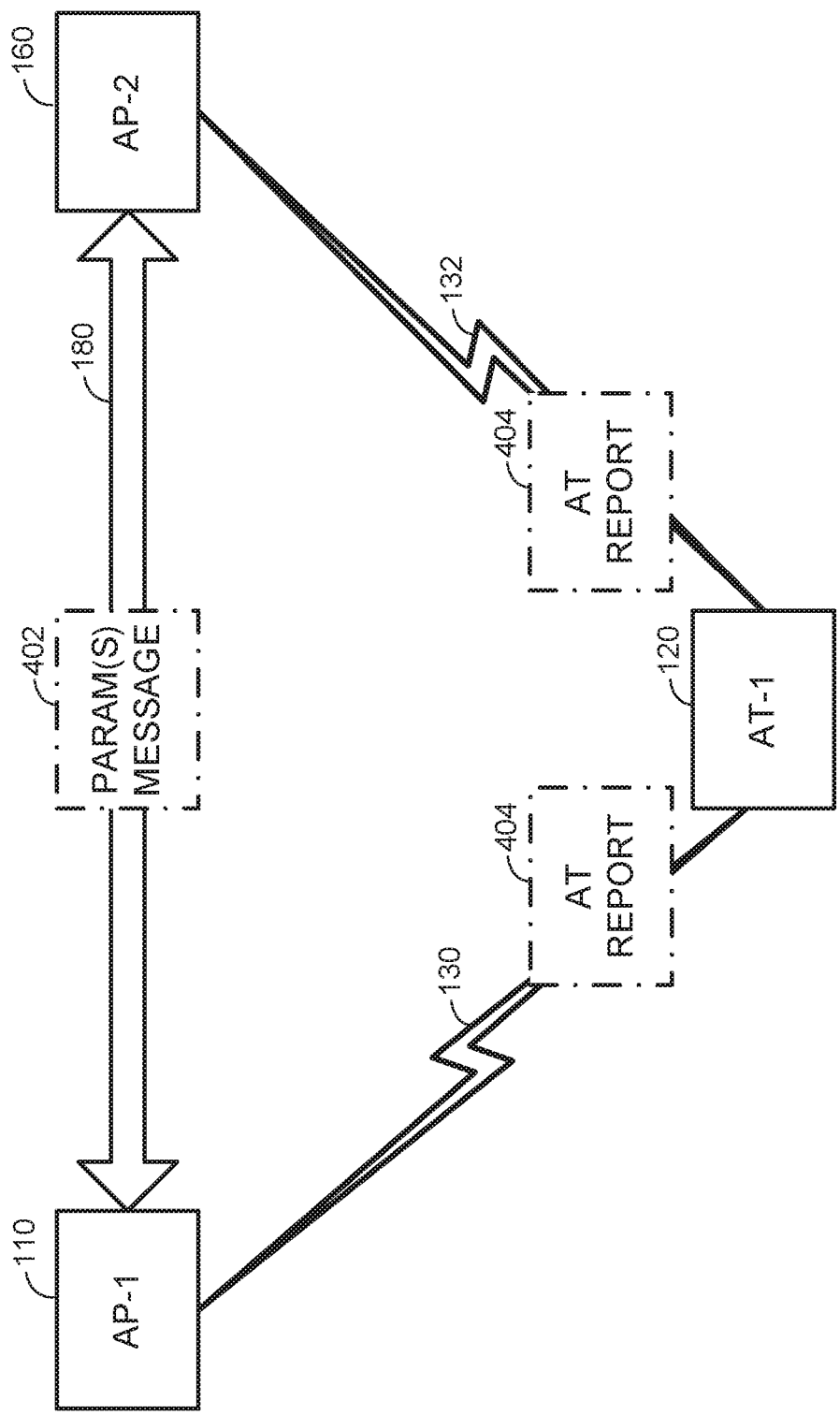
FIG. 4 illustrates an example of inter-access point coordination with respect to backoff thresholds.

FIG. 4 illustrates an example of inter-access point coordination with respect to backoff thresholds. In this example, the serving access point 110 and the target access point 160 have access to the shared backhaul connection 180 (e.g., X2 interface) and respective wireless links 130 and 132 with the access terminal 120.

In some networks, the adapted backoff threshold(s) may be coordinated between the source access point 110 and the target access point 160. Coordination may help to maintain fairness between the first system A 100 and the second system B 150. Otherwise, a disparity may arise between their respective backoff thresholds, such that one system would yield the communication medium 140 to the other less often, leading to a corresponding disparity in medium access.

As an example, the source access point 110 and the target access point 160 may exchange a backoff threshold parameter(s) message 402 over the backhaul connection 180, or via an over-the-air connection between the two, if available. The backoff threshold parameter(s) message 402 may indicate to the receiving entity that one or more backoff thresholds have been set to a given level and request that the receiving entity do the same or similar. As another example, the source access point 110 and/or the target access point 160 may receive an access terminal report 404 from the access terminal 120 over the respective wireless links 130 and 132 (e.g., as part of a mobility message to the target access point 160, a measurement report to the source access point 110, etc.). The access terminal report 404 may indicate to the receiving entity that one or more backoff thresholds have been set to a given level and prompt the receiving entity do the same or similar.

Figure 5:
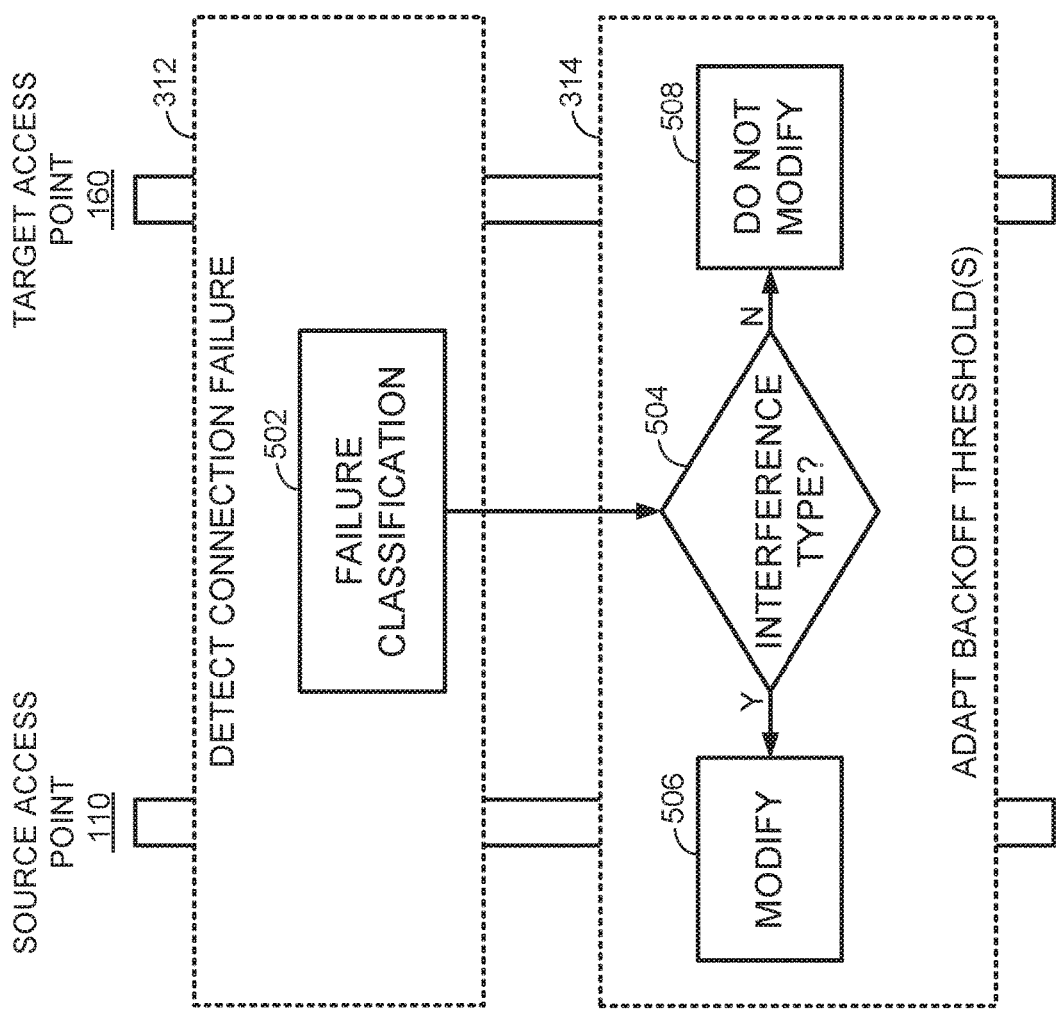
FIG. 5 is a flow chart illustrating an example of classification-based backoff threshold adaption.

FIG. 5 is a flow chart illustrating an example of classification-based backoff threshold adaption. The illustrated diagram shows additional aspects that may be implemented as part of the detecting (block 312) and the adapting (block 314) of FIG. 3.

In some designs, the source access point 110 and/or the target access point 160 may selectively adapt the backoff threshold(s) based on the type of connection failure that is detected. As an example, the source access point 110 and/or the target access point 160 may adapt the backoff threshold(s) when it is determined that the connection failure is an interference-type of failure (e.g., a "too late" or "too early" type failure), but not when it is determined that the connection failure is due to some other cause (e.g., a "wrong cell" type of failure). Based on the respective signal strengths reported by the access terminal 120 in its RLF report, for example, it may be determined that both the source access point 110 and the target access point 160 have low signal strength values—indicating a coverage hole—as opposed to a high signal strength of the target access point 160 and a low signal strength of the source access point 110, which would indicate an interference-type of failure. Connection failures due to coverage holes are unlikely to be helped by a more deferential backoff threshold, which would therefore simply reduce medium access and overall network capacity.

In the illustrated example of FIG. 5, the source access point 110 and/or the target access point 160 may first classify the detected connection failure (block 502). If the classification indicates an interference-type failure (yes' at decision 504), the backoff threshold(s) may be modified (block 506). Otherwise, if the classification indicates another type of failure ('no' at decision 504), the backoff threshold(s) may not be modified (block 508).

Figure 6:
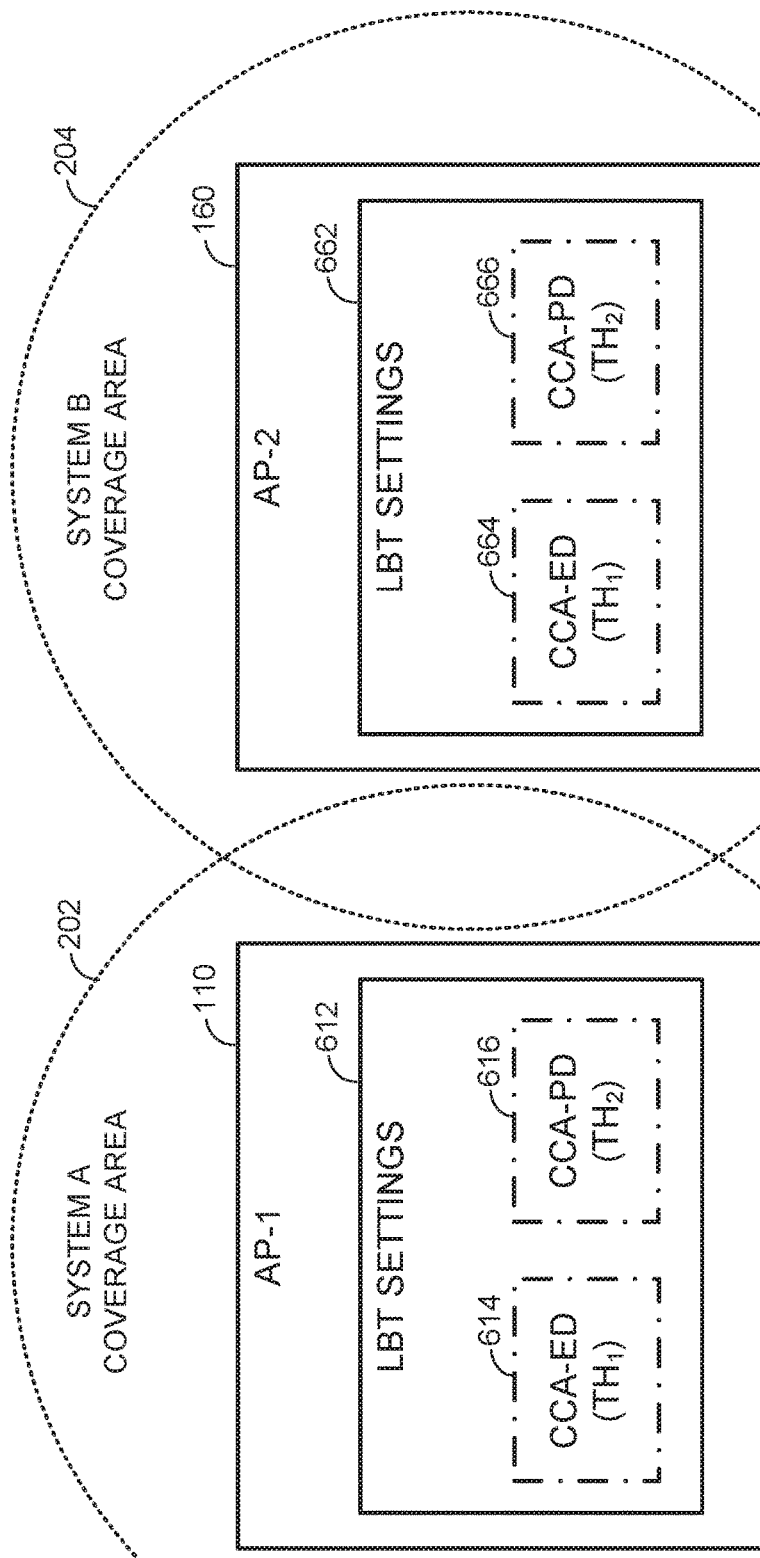
FIG. 6 illustrates an example of Listen Before Talk (LBT)-mode switching to effectuate the adaption of the backoff threshold(s).

FIG. 6 illustrates an example of LBT-mode switching to effectuate the adaption of the backoff threshold(s). In this example, the serving access point 110 and the target access point 160 are shown again in their respective coverage areas 202 and 204.

In some designs, the source access point 110 and/or the target access point 160 may effectuate the adaption of the backoff threshold(s) by switching an LBT mode from a first detection mechanism having a first backoff threshold to a second detection mechanism having a second backoff threshold that is lower than the first backoff threshold. As discussed above, distinct CCA-ED and CCA-PD mechanisms, for example, may utilize different backoff thresholds for yielding the communication medium 140 to different types of systems (e.g., to inter-RAT and intra-RAT traffic, respectively). By agreeing to use a CCA-PD mechanism as opposed to CCA-ED mechanism, the source access point 110 and the target access point 160 can implement the correspondingly lower backoff threshold and thereby treat each other more deferentially during contention.

In the illustrated example of FIG. 6, the source access point 110 and/or the target access point 160 may switch their respective LBT settings 612 and 662, in response to a connection failure between the two entities, from a respective CCA-ED setting 614 and 664 having a first threshold ($TH_1$) to a respective CCA-PD setting 616 and 666 having a second threshold ($TH_2$).

Figure 7:
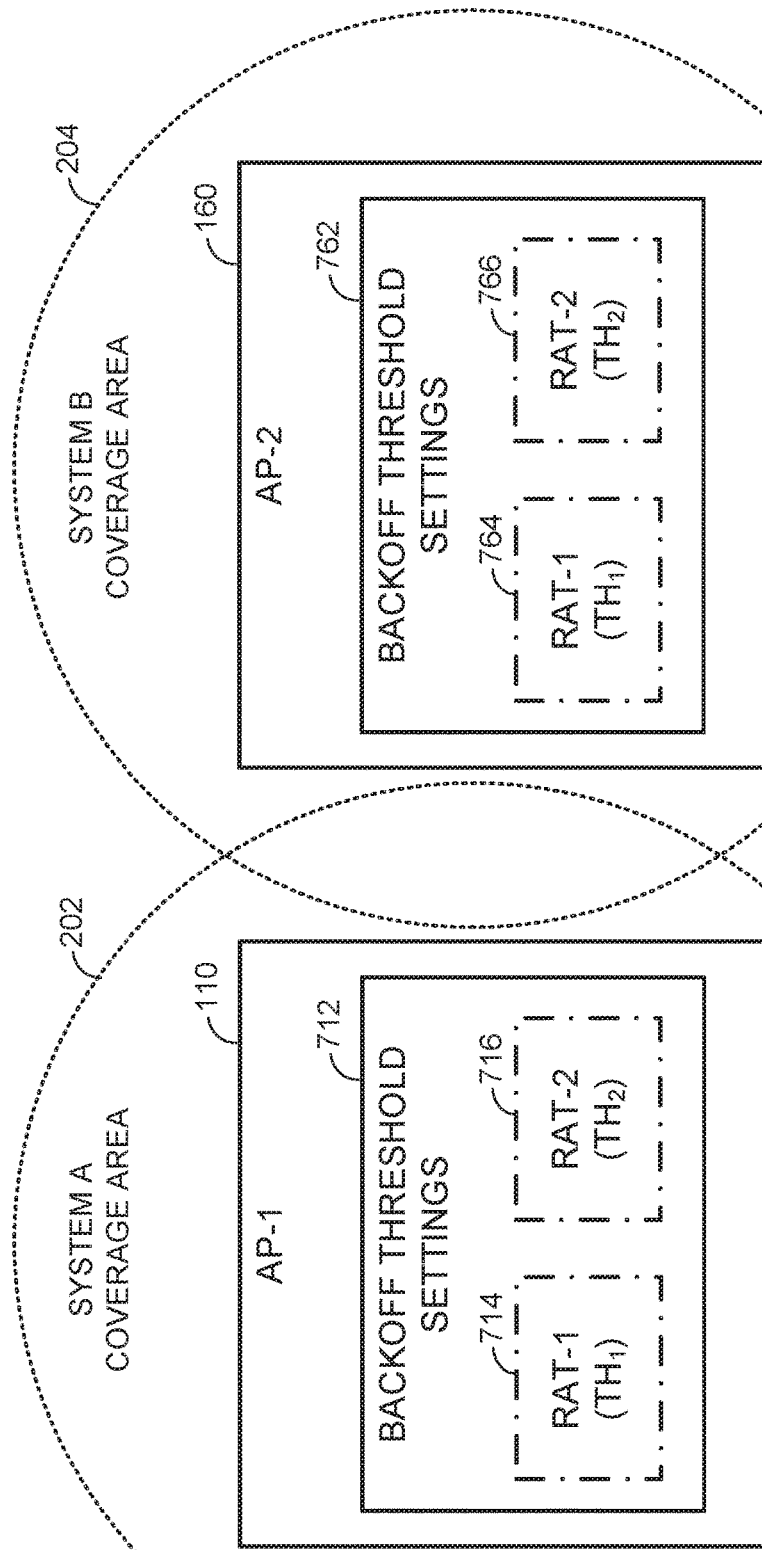
FIG. 7 illustrates an example of RAT-specific backoff threshold(s) settings.

FIG. 7 illustrates an example of RAT-specific backoff threshold(s) settings. In this example, the serving access point 110 and the target access point 160 are shown again in their respective coverage areas 202 and 204.

In some designs, the source access point 110 and/or the target access point 160 may maintain RAT-specific backoff thresholds and set them to different values for different RATs. For example, if a particular RAT has been determined to be interfering and leading to increased connection failures, a CCA-PD mechanism having a lower backoff threshold may be used for yielding the communication medium 140 to entities associated with that RAT, as opposed to a CCA-ED mechanism used for other RATs.

In the illustrated example of FIG. 7, the source access point 110 and/or the target access point 160 may set their backoff threshold(s) settings 712 and 762, in response to a connection failure between the two entities, to a respective RAT-1 setting 714 and 764 having a first threshold ($TH_1$) or to a respective RAT-2 setting 716 and 766 having a second threshold ($TH_2$).

Figure 8:
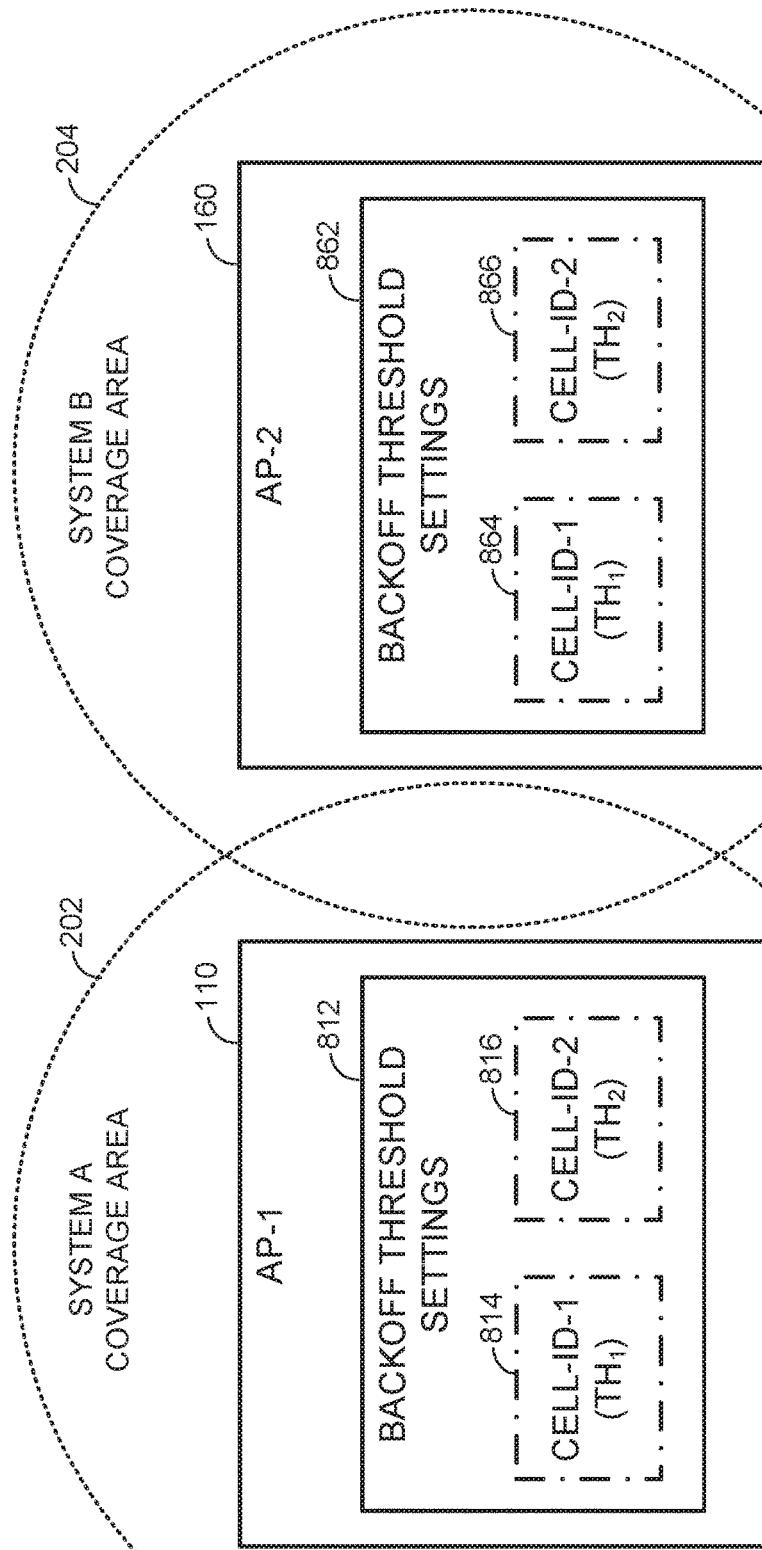
FIG. 8 illustrates an example of Cell Identifier (Cell ID)-specific backoff threshold(s) settings.

FIG. 8 illustrates an example of Cell Identifier (Cell ID)-specific backoff threshold(s) settings. In this example, the serving access point 110 and the target access point 160 are shown again in their respective coverage areas 202 and 204.

In some designs, the source access point 110 and/or the target access point 160 may maintain further-refined Cell-ID-specific backoff thresholds and set them to different values for different Cell IDs (e.g., Physical Cell ID (PCI)). For example, if a particular access point has been determined to be interfering and leading to increased connection failures (e.g., a cell with a signal strength that ramps up quickly, such as one encountered in an urban environment when a typical user may turn a corner), a CCA-PD mechanism having a lower backoff threshold may be used for yielding the communication medium 140 to that entity in particular, as opposed to a CCA-ED mechanism used for other Cell IDs.

In the illustrated example of FIG. 8, the source access point 110 and/or the target access point 160 may set their backoff threshold(s) settings 812 and 862, in response to a connection failure between the two entities, to a respective Cell-ID-1 setting 814 and 864 having a first threshold ($TH_1$) or to a respective Cell-ID-2 setting 816 and 866 having a second threshold ($TH_2$).

Figure 9:
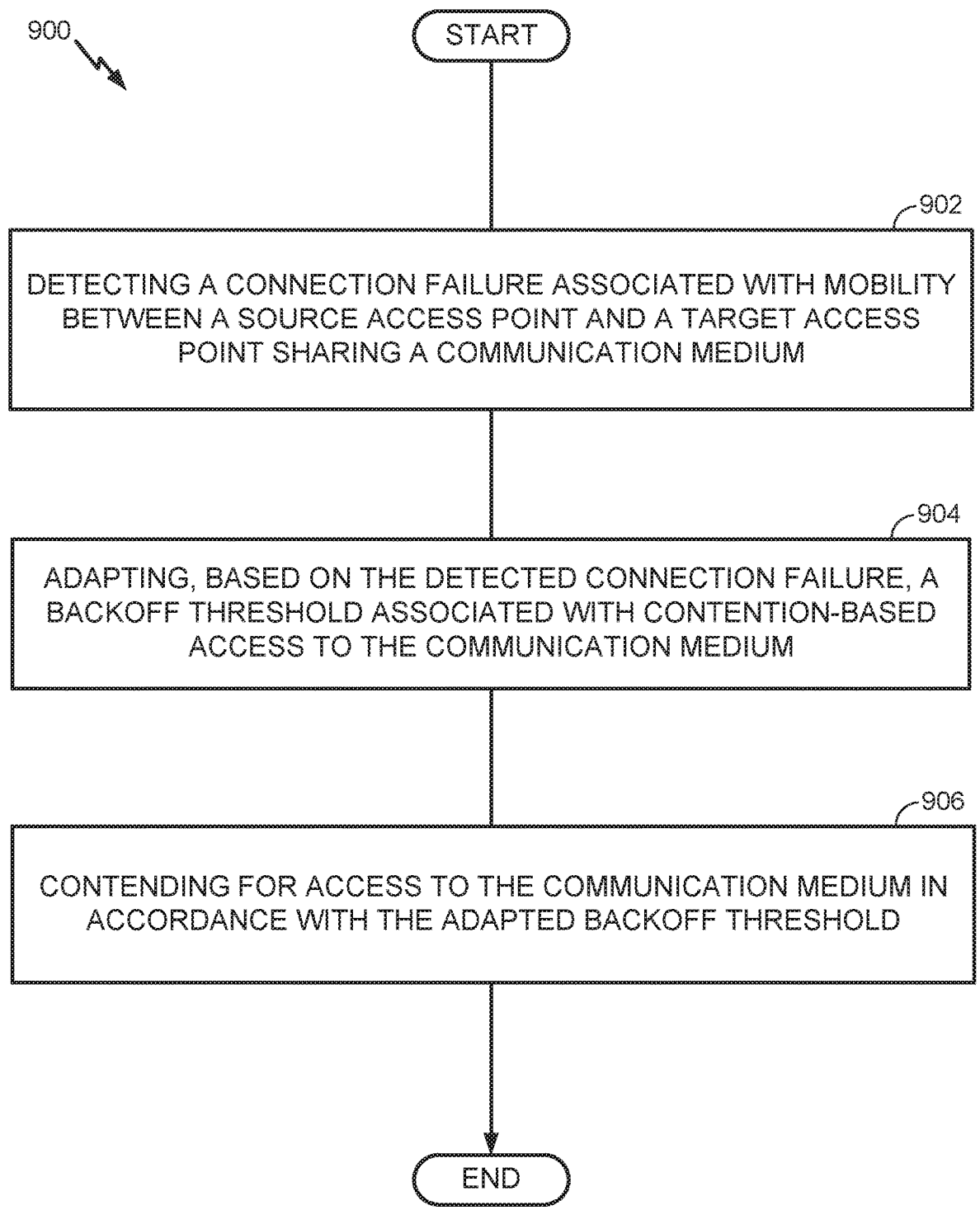
FIG. 9 is a flow diagram illustrating an example method of communication in accordance with the techniques described herein.

FIG. 9 is a flow diagram illustrating an example method of communication in accordance with the techniques described above. The method 900 may be performed, for example, by an access point (e.g., the access point 110 or the access point 160 illustrated in FIG. 1) operating on a shared communication medium. As an example, the communication medium may include one or more time, frequency, or space resources on an unlicensed radio frequency band shared between LTE technology and Wi-Fi technology devices.

As shown, the access point may detect a connection failure associated with mobility between a source access point and a target access point sharing a communication medium (block 902). The access point may be either the source or target access point. The access point may then adapt, based on the detected connection failure, a backoff threshold associated with contention-based access to the communication medium (block 904) and contend for access to the communication medium in accordance with the adapted backoff threshold (block 906). It will be appreciated that the access point may also (separately) adapt, based on the detected connection failure, one or more handover parameters distinct from the backoff threshold.

As discussed in more detail above, the adapting (block 904) may comprise, for example, lowering the backoff threshold from a first value to a second value in response to detecting the connection failure.

The detecting (block 902) may utilize, for example, communication between the source access point and the target access point. Here, the detecting may further utilize MRO procedures. In addition or as an alternative, the detecting (block 902) may utilize communication between the access terminal and the source access point, communication between the access terminal and the target access point, or a combination thereof.

In some designs or scenarios, the access point may coordinate the adapted backoff threshold between the source access point and the target access point, via a backhaul connection, an over-the-air connection, or an access terminal report.

In some designs or scenarios, the detecting (block 902) may comprise classifying the detected connection failure and the adapting (block 904) may comprise selectively adapting the backoff threshold based on the classifying.

As an example, the adapting (block 904) may comprise switching an LBT mode from a first detection mechanism having a first backoff threshold to a second detection mechanism having a second backoff threshold that is lower than the first backoff threshold. For example, the first detection mechanism may correspond to a CCA-ED mechanism and the second detection mechanism may correspond to a CCA-PD mechanism.

The backoff threshold may be a RAT-specific threshold, with the adapting (block 904) comprising, for example, setting a first backoff threshold associated with a first RAT to a first value and a second backoff threshold associated with a second RAT to a second value that is different from the first value. The backoff threshold may also be a Cell ID-specific threshold, with the adapting (block 904) comprising setting a first backoff threshold associated with a first Cell ID to a first value and a second backoff threshold associated with a second Cell ID to a second value that is different from the first value.

It will be appreciated from the discussion above that the connection failure may correspond, for example, to a handover failure or an RLF.

For generality, the access point 110 and the access point 160 are shown in FIG. 1 only in relevant part as including the contention manager 112 and the contention manager 162, respectively. It will be appreciated, however, that the access point 110 and the access point 160 may be configured in various ways to provide or otherwise support the contention management techniques discussed herein.

Figure 10:
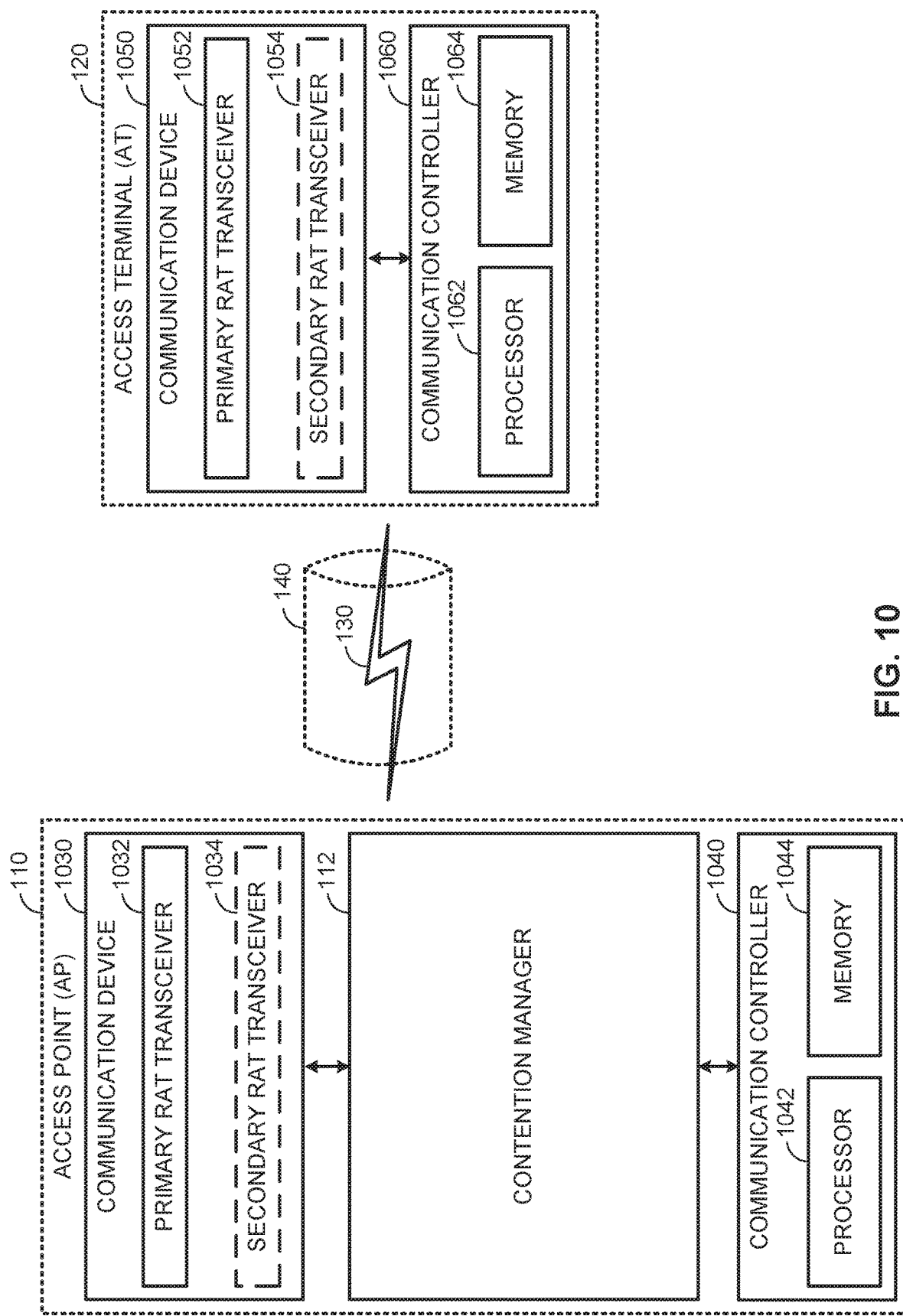
FIG. 10 is a device-level diagram illustrating example components of an access point and an access terminal in more detail.

FIG. 10 is a device-level diagram illustrating example components of the access point 110 and the access terminal 120 in more detail. It will be appreciated that the access point 160 and the access terminal 170 may be similarly configured, with the example components of the access point 110 and the access terminal 120 being shown for illustration purposes only.

As shown, the access point 110 and the access terminal 120 may each generally include a wireless communication device (represented by the communication devices 1030 and 1050) for communicating with other wireless nodes via at least one designated RAT. The communication devices 1030 and 1050 may be variously configured for transmitting and encoding signals, and, conversely, for receiving and decoding signals in accordance with the designated RAT (e.g., messages, indications, information, pilots, and so on).

The communication devices 1030 and 1050 may include, for example, one or more transceivers, such as respective primary RAT transceivers 1032 and 1052, and, in some designs, (optional) co-located secondary RAT transceivers 1034 and 1054, respectively (corresponding, for example, to the RAT employed by the second system B 150, if different than the first system A 100). As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a radio chip or similar circuitry providing low-level sniffing only). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The access point 110 and the access terminal 120 may also each generally include a communication controller (represented by the communication controllers 1040 and 1060) for controlling operation of their respective communication devices 1030 and 1050 (e.g., directing, modifying, enabling, disabling, etc.). The communication controllers 1040 and 1060 may include one or more processors 1042 and 1062, and one or more memories 1044 and 1064 coupled to the processors 1042 and 1062, respectively. The memories 1044 and 1064 may be configured to store data, instructions, or a combination thereof, either as on-board cache memory, as separate components, a combination, etc. The processors 1042 and 1062 and the memories 1044 and 1064 may be standalone communication components or may be part of the respective host system functionality of the access point 110 and the access terminal 120.

It will be appreciated that the contention manager 112 (as representative of the contention manager 112 and the contention manger 162) may be implemented in different ways. In some designs, some or all of the functionality associated therewith may be implemented by or otherwise at the direction of at least one processor (e.g., one or more of the processors 1042 and/or one or more of the processors 1062), at least one memory (e.g., one or more of the memories 1044 and/or one or more of the memories 1064), at least one transceiver (e.g., one or more of the transceivers 1032 and 1034 and/or one or more of the transceivers 1052 and 1054), or a combination thereof. In other designs, some or all of the functionality associated therewith may be implemented as a series of interrelated functional modules.

Accordingly, it will be appreciated that the components in FIG. 10 may be used to perform operations described above with respect to FIGS. 1-9. For example, the access point 110 may, via the processor 1042 and the memory 1044, detect a connection failure associated with mobility between a source access point and a target access point sharing a communication medium and adapt, based on the detected connection failure, a backoff threshold associated with contention-based access to the communication medium. The access point 110 may, via the primary RAT transceiver 1032, configured to contend for access to the communication medium in accordance with the adapted backoff threshold.

Figure 11:
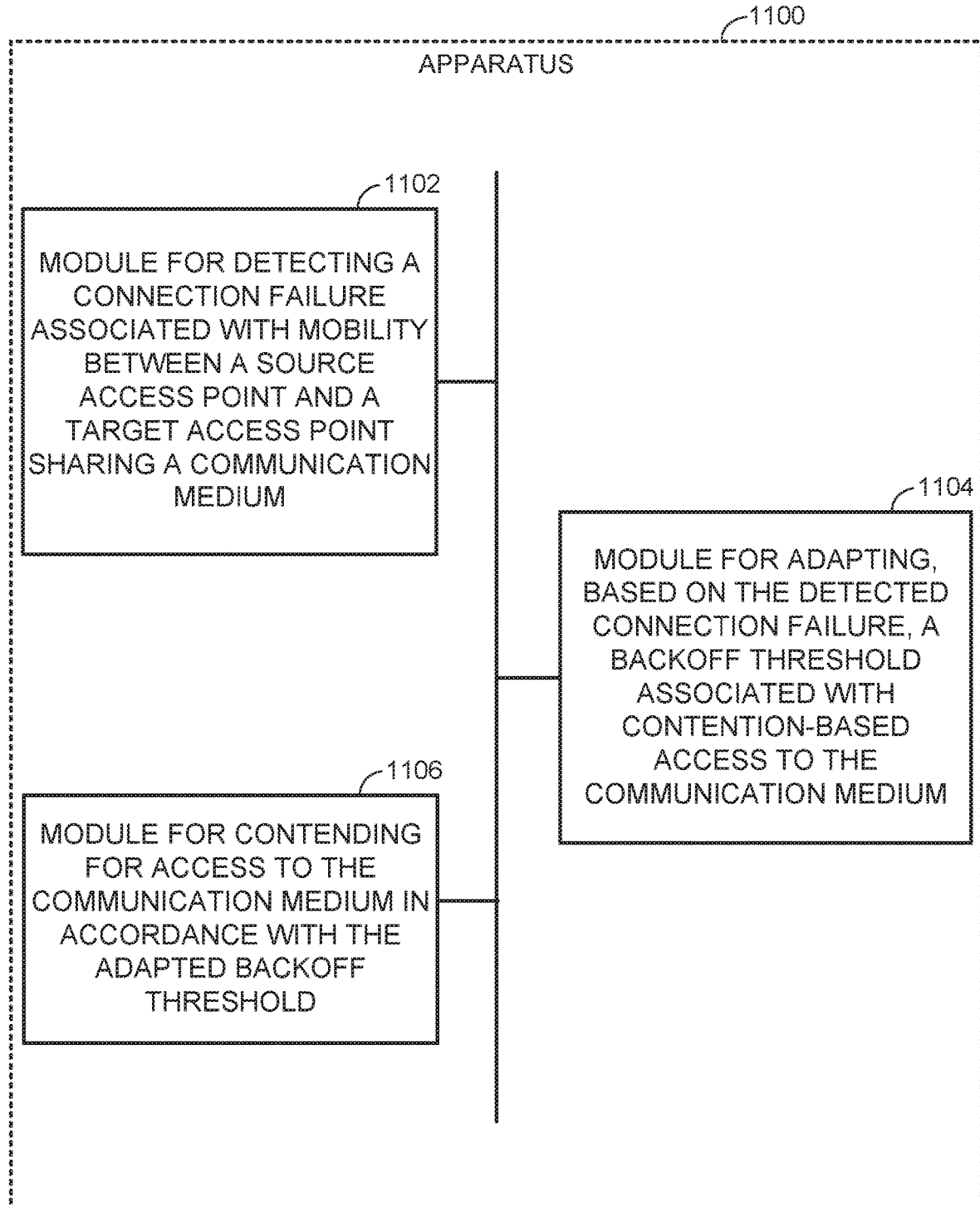
FIG. 11 illustrates an example apparatus represented as a series of interrelated functional modules.

FIG. 11 illustrates an example access point apparatus for implementing the contention manager 112 and/or the contention manager 162 represented as a series of interrelated functional modules. In the illustrated example, the apparatus 1100 includes a module for detecting 1102, a module for adapting 1104, and a module for contending 1106.

The module for detecting 1102 may be configured to detect a connection failure associated with mobility between a source access point and a target access point sharing a communication medium. The module for adapting 1104 may be configured to adapt, based on the detected connection failure, a backoff threshold associated with contention-based access to the communication medium. The module for contending 1106 may be configured to contend for access to the communication medium in accordance with the adapted backoff threshold.

The functionality of the modules of FIG. 11 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 11, as well as other components and functions described herein, may be implemented using any suitable means. Such means also may be implemented, at least in part, using corresponding structure as taught herein. For example, the components described above in conjunction with the "module for" components of FIG. 11 also may correspond to similarly designated "means for" functionality. Thus, in some aspects one or more of such means may be implemented using one or more of processor components, integrated circuits, or other suitable structure as taught herein, including as an algorithm. One skilled in the art will recognize in this disclosure an algorithm represented in the prose described above, as well in sequences of actions that may be represented by pseudocode. For example, the components and functions represented by FIG. 11 may include code for performing a LOAD operation, a COMPARE operation, a RETURN operation, an IF-THEN-ELSE loop, and so on.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying a method for communication.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A communication method, comprising:
   detecting, by an access point, a connection failure associated with mobility between a source access point and a target access point sharing a communication medium, the access point being one of the source access point and the target access point;
   adapting, by the access point based on the detected connection failure, a backoff threshold for use by the access point and associated with contention-based access to the communication medium, the backoff threshold being adapted so as to increase a likelihood of the source access point yielding the communication medium to the target access point; and
   contending, by the access point, for access to the communication medium in accordance with the adapted backoff threshold,
   wherein the access point notifies the other of the source and target access points of the adapted backoff threshold,
   wherein the adapting comprises switching a Listen Before Talk (LBT) mode from a first detection mechanism having a first backoff threshold to a second detection mechanism having a second backoff threshold that is lower than the first backoff threshold, and
   wherein the first detection mechanism corresponds to a Clear Channel Assessment (CCA) Energy Detection (CCA-ED) mechanism and the second detection mechanism corresponds to a CCA Preamble Detection (CCA-PD) mechanism.

2. The method of claim 1, further comprising adapting, by the access point based on the detected connection failure, one or more handover parameters distinct from the backoff threshold.

3. The method of claim 1, wherein the adapting comprises lowering the backoff threshold from a first value to a second value in response to detecting the connection failure.

4. The method of claim 1, wherein the detecting utilizes communication between the source access point and the target access point.

5. The method of claim 4, wherein the detecting further utilizes Mobility Robustness Optimization (MRO) procedures.

6. The method of claim 1, wherein the detecting utilizes communication between an access terminal and the source access point, communication between the access terminal and the target access point, or a combination thereof.

7. The method of claim 1, further comprising coordinating, by the access point, the adapted backoff threshold with the other of the source access point and the target access point, via a backhaul connection, an over-the-air connection, or an access terminal report.

8. The method of claim 1, wherein:
   the detecting comprises classifying the detected connection failure; and
   the adapting comprises selectively adapting the backoff threshold based on the classifying.

9. The method of claim 1, wherein the backoff threshold is a Radio Access Technology (RAT)-specific threshold and wherein the adapting comprises setting a first backoff threshold associated with a first RAT to a first value and a second backoff threshold associated with a second RAT to a second value that is different from the first value.

10. The method of claim 1, wherein the backoff threshold is a Cell Identifier (Cell ID)-specific threshold and wherein the adapting comprises setting a first backoff threshold associated with a first Cell ID to a first value and a second backoff threshold associated with a second Cell ID to a second value that is different from the first value.

11. The method of claim 1, wherein the connection failure corresponds to a Radio Link Failure (RLF) or a handover failure.

12. A communication apparatus of an access point, comprising:
    at least one processor;
    at least one memory coupled to the at least one processor, the at least one processor and the at least one memory being configured to:
       detect a connection failure associated with mobility between a source access point and a target access point sharing a communication medium, the access point being one of the source access point and the target access point, and
       adapt, based on the detected connection failure, a backoff threshold for use by the access point and associated with contention-based access to the communication medium, the backoff threshold being adapted so as to increase a likelihood of the source access point yielding the communication medium to the target access point; and at least one transceiver configured to contend for access to the communication medium in accordance with the adapted backoff threshold, wherein the access point notifies the other of the source and target access points of the adapted backoff threshold, wherein the at least one processor and the at least one memory are configured to adapt the backoff threshold by switching a Listen Before Talk (LBT) mode from a first detection mechanism having a first backoff threshold to a second detection mechanism having a second backoff threshold that is lower than the first backoff threshold, and wherein the first detection mechanism corresponds to a Clear Channel Assessment (CCA) Energy Detection (CCA-ED) mechanism and the second detection mechanism corresponds to a CCA Preamble Detection (CCA-PD) mechanism.

13. The apparatus of claim 12, wherein the at least one processor and the at least one memory are further configured to adapt, based on the detected connection failure, one or more handover parameters distinct from the backoff threshold.

14. The apparatus of claim 12, wherein the at least one processor and the at least one memory are configured to adapt the backoff threshold by lowering the backoff threshold from a first value to a second value in response to detecting the connection failure.

15. The apparatus of claim 12, wherein the at least one processor and the at least one memory are configured to detect the connection failure by utilizing communication between the source access point and the target access point.

16. The apparatus of claim 15, wherein the at least one processor and the at least one memory are configured to detect the connection failure by further utilizing Mobility Robustness Optimization (MRO) procedures.

17. The apparatus of claim 12, wherein the at least one processor and the at least one memory are configured to detect the connection failure by utilizing communication between an access terminal and the source access point, communication between the access terminal and the target access point, or a combination thereof.

18. The apparatus of claim 12, wherein the at least one transceiver is further configured to coordinate the adapted backoff threshold with the other of the source access point and the target access point, via a backhaul connection, an over-the-air connection, or an access terminal report.

19. The apparatus of claim 12, wherein the at least one processor and the at least one memory are further configured to:
classify the detected connection failure; and
selectively adapt the backoff threshold based on the classifying.

20. The apparatus of claim 12, wherein the backoff threshold is a Radio Access Technology (RAT)-specific threshold and wherein the at least one processor and the at least one memory are configured to adapt the backoff threshold by setting a first backoff threshold associated with a first RAT to a first value and a second backoff threshold associated with a second RAT to a second value that is different from the first value.

21. The apparatus of claim 12, wherein the backoff threshold is a Cell Identifier (Cell ID)-specific threshold and wherein the at least one processor and the at least one memory are configured to adapt the backoff threshold by setting a first backoff threshold associated with a first Cell ID to a first value and a second backoff threshold associated with a second Cell ID to a second value that is different from the first value.

22. The apparatus of claim 12, wherein the connection failure corresponds to a Radio Link Failure (RLF) or a handover failure.

23. A communication apparatus of an access point, comprising:
means for detecting a connection failure associated with mobility between a source access point and a target access point sharing a communication medium, the access point being one of the source access point and the target access point;
means for adapting, based on the detected connection failure, a backoff threshold for use by the access point and associated with contention-based access to the communication medium, the backoff threshold being adapted so as to increase a likelihood of the source access point yielding the communication medium to the target access point; and
means for contending for access to the communication medium in accordance with the adapted backoff threshold,
wherein the access point notifies the other of the source and target access points of the adapted backoff threshold,
wherein the means for adapting (1104) switches a Listen Before Talk (LBT) mode from a first detection mechanism having a first backoff threshold to a second detection mechanism having a second backoff threshold that is lower than the first backoff threshold, and
wherein the first detection mechanism corresponds to a Clear Channel Assessment (CCA) Energy Detection (CCA-ED) mechanism and the second detection mechanism corresponds to a CCA Preamble Detection (CCA-PD) mechanism.

24. The apparatus of claim 23, wherein the means for adapting comprises means for lowering the backoff threshold from a first value to a second value in response to detecting the connection failure.

25. A non-transitory computer-readable medium comprising code, which, when executed by at least one processor of an access point, causes the at least one processor to perform operations for communication, the non-transitory computer-readable medium comprising:
code for detecting a connection failure associated with mobility between a source access point and a target access point sharing a communication medium, the access point being one of the source access point and the target access point;
code for adapting, based on the detected connection failure, a backoff threshold for use by the access point and associated with contention-based access to the communication medium, the backoff threshold being adapted so as to increase a likelihood of the source access point yielding the communication medium to the target access point; and
code for contending for access to the communication medium in accordance with the adapted backoff threshold,
wherein the access point notifies the other of the source and target access points of the adapted backoff threshold,
wherein the code for adapting comprises code for switching a Listen Before Talk (LBT) mode from a first detection mechanism having a first backoff threshold to a second detection mechanism having a second backoff threshold that is lower than the first backoff threshold, and wherein the first detection mechanism corresponds to a Clear Channel Assessment (CCA) Energy Detection (CCA-ED) mechanism and the second detection mechanism corresponds to a CCA Preamble Detection (CCA-PD) mechanism.

26. The non-transitory computer-readable medium of claim 25, wherein the code for adapting comprises code for lowering the backoff threshold from a first value to a second value in response to detecting the connection failure.

\* \* \* \* \*